(12) United States Patent
Cho

(10) Patent No.: US 9,503,143 B2
(45) Date of Patent: Nov. 22, 2016

(54) METHOD OF CONTROLLING TRANSMISSION OUTPUT AND ELECTRONIC DEVICE THEREOF

(71) Applicant: Samsung Electronics Co., Ltd., Gyeonggi-do (KR)

(72) Inventor: Dong-Hyun Cho, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 196 days.

(21) Appl. No.: 14/328,649

(22) Filed: Jul. 10, 2014

(65) Prior Publication Data

US 2015/0017936 A1 Jan. 15, 2015

(30) Foreign Application Priority Data

Jul. 10, 2013 (KR) .................. 10-2013-0080929

(51) Int. Cl.
*H04B 1/38* (2015.01)
*H04W 52/28* (2009.01)
*G06F 3/044* (2006.01)
*H04B 1/3827* (2015.01)

(52) U.S. Cl.
CPC .......... *H04B 1/3838* (2013.01); *H04W 52/288* (2013.01)

(58) Field of Classification Search
CPC ................. H04W 52/28; H04B 1/3838; H04B 5/0043; H04B 5/02; H04B 1/44; H04B 1/74; H04B 7/08; G06F 3/044; G06F 1/3262; G06F 3/042; G06F 2203/04101; G06F 2203/04106

See application file for complete search history.

(56) References Cited

U.S. PATENT DOCUMENTS

| 9,037,190 B2* | 5/2015 | Desclos | H04B 7/15 455/550.1 |
|---|---|---|---|
| 2003/0064761 A1 | 4/2003 | Nevermann | |
| 2012/0071195 A1 | 3/2012 | Chakraborty et al. | |
| 2013/0310106 A1* | 11/2013 | Wang | H03K 17/955 455/550.1 |
| 2013/0314365 A1* | 11/2013 | Woolley | G06F 3/044 345/174 |
| 2014/0043259 A1* | 2/2014 | Park | G06F 3/0412 345/173 |
| 2015/0160780 A1* | 6/2015 | Park | G06F 3/0418 345/173 |
| 2015/0236758 A1* | 8/2015 | Choi | H04B 5/02 455/41.1 |
| 2015/0303979 A1* | 10/2015 | Shin | H04B 1/74 455/78 |

FOREIGN PATENT DOCUMENTS

| KR | 10-1997-0049307 | 7/1997 |
|---|---|---|
| KR | 20-0209403 | 10/2000 |
| KR | 10-2011-0005561 | 1/2011 |

* cited by examiner

*Primary Examiner* — Pablo Tran

(57) ABSTRACT

An electronic device performs a method for controlling a transmission output based on an input mode entrance. The electronic device includes a display configured to detect an input and a processor configured to control a transmission output according to whether an input is detected by the display.

17 Claims, 8 Drawing Sheets

METHOD OF CONTROLLING TRANSMISSION OUTPUT AND ELECTRONIC DEVICE THEREOF

PRIORITY

The present application is related to and claims priority under 35 U.S.C. §119 to an application filed in the Korean Intellectual Property Office on Jul. 10, 2013 and assigned Serial No. 10-2013-0080929, the contents of which are incorporated herein by reference.

TECHNICAL FIELD

Various embodiments of the present disclosure relates to a method for controlling transmission output and an electronic device thereof.

BACKGROUND

Recently, electronic devices are increasing which have convergence functions compositely performing one or more functions.

One such example electronic device, a mobile terminal called a 'smart phone', is mainly used. In particular, such a mobile terminal includes a large screen touch type display module. Besides a basic function of communication with an opposite party, the mobile terminal includes a high pixel camera module capable of capturing a still image and a video. In addition, the mobile terminal can play multimedia content such as music or video, and can access a network and perform Internet surfing. Such a mobile terminal includes a high performance processor and is advanced to rapidly perform various convergence functions. Accordingly, the main function of communication with another party seems to be rather an additional function.

Improvements to electronic devices include efforts to reduce a specific absorption rate (SAR), which is a numerical expression of an electromagnetic wave absorbed by a human body. For example, during use of an electronic device, since a high measurement value of absorption power per unit mass of an electromagnetic wave absorbed by a human body may badly affect the human body, every country restricts the electromagnetic wave SAR for the head portion of a human body to be not greater than a reference value. The maximum allowed electromagnetic wave SAR in Korea is 1.6 W/Kg which is identical to that of the US; Europe and Japan have a greater value of 2.0 W/Kg.

Typically, the electronic device may adjust the electromagnetic wave SAR by adjusting a transmission output value thereof, but an adjustment time of the transmission output value is determined dependently on a sensor.

SUMMARY

To address the above-discussed deficiencies, it is a primary object to provide an apparatus and method for selectively reducing a specific absorption rate (SAR) of electromagnetic wave and assisting efficient use of an electronic device.

Another object of the present disclosure is to provide an electronic device capable of reducing an electromagnetic SAR by controlling a transmission output value when entering an input mode.

Another object of the present disclosure is to provide an electronic device capable of controlling a transmission output by detecting a hovering input or a touch input.

Another object of the present disclosure is to provide an electronic device controlling a transmission power by detecting a hard key input for entering an input mode.

According to an aspect of the present disclosure, an electronic device includes a display configured to detect an input; and a processor configured to control a transmission output according to whether an input is detected by the display.

According to another aspect of the present disclosure, a method of controlling transmission power in an electronic device, includes confirming that an input mode entering request is detected; when the input mode entering request is not detected, maintaining transmission power to a default value; and when the input mode entering request is detected, reducing the transmission output to a preset value.

According to another aspect of the present disclosure, a non-transitory computer readable medium having a program recorded thereon, which, when executed, cause a computer to perform: confirming that an input mode entering request is detected; when the input mode entering request is not detected, maintaining transmission power to a default value; and when the input mode entering request is detected, reducing the transmission output to a preset value.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
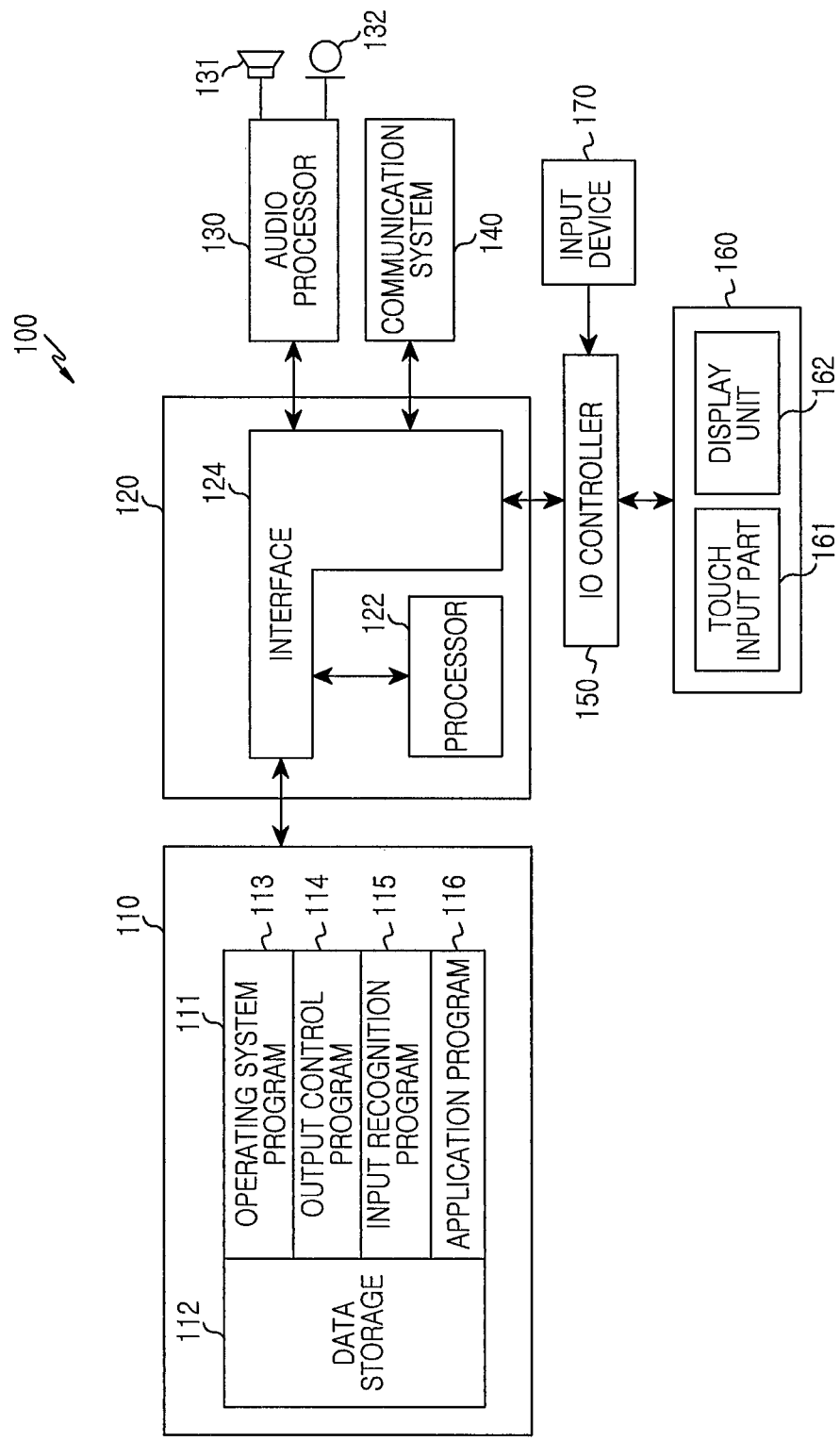
FIG. 1 is a block diagram illustrating a configuration of an electronic device controlling transmission output thereof according to various embodiments of the present disclosure.

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device. Preferred embodiments of the present disclosure will be described herein below with reference to the accompanying drawings. In the following description, detailed descriptions of well-known functions or constructions will be omitted since they would obscure the disclosure in unnecessary detail. Also, the terms used herein are defined according to the functions of the present disclosure. Thus, the terms may vary depending on a user's or operator's intentions or practices. Therefore, the terms used herein are to be understood based on the descriptions made herein.

A touch screen may be variously used as an input or display device performing input and display of information on one screen. Accordingly, when the touch screen is used, a display area may become increased by removing a separate input device such as a keypad.

Improvements to electronic devices include efforts to reduce a specific absorption rate (SAR) of electromagnetic waves absorbed by a human body. For example, during use of an electronic device, since a high measurement value of absorption power per unit mass of an electromagnetic wave absorbed by a human body may badly affect the human body, every country restricts the SAR of electromagnetic wave for the head portion of a human body to be not greater than a reference value. The maximum allowed SAR of electromagnetic wave in Korea is 1.6 W/Kg which is identical to the US; Europe and Japan have a greater value of 2.0 W/Kg.

Typically, the electronic device may adjust an electromagnetic wave SAR by adjusting a transmission output value and confirm adjustment time of the transmission output value by using information collected by a sensor. For example, the electronic device may adjust the transmission output value at the time of being grasped by a user by using a sensor (for example, a grip sensor) capable of confirming a grasping state. For another example, the electronic device may adjust the transmission output value when a human body is in proximity by using a sensor (for example, a proximity sensor) capable of confirming proximity of the human body.

The electronic device according to various embodiments of the present disclosure may adjust a transmission output value at the time of entering an input mode thereof. For example, the electronic device may adjust a transmission output value when a touch input or a hovering input is detected. This is for determining whether to use the electronic device by using an input to a touch panel.

The electronic device may include an input unit for enabling a touch input or a hovering input. Such an input unit may be an electronic pen or a stylus pen having a structure of being inserted into or withdrawn from the electronic device.

In addition, the electronic device may determine a state where the electronic device is inserted and determine that an operation thereof may be controlled by the user, when the input unit is withdrawn. For example, when the input unit is withdrawn, the electronic device may determine that the input mode is to be entered.

The electronic device according to various embodiments of the present disclosure may adjust a transmission output value when the input unit is confirmed to be withdrawn.

The input mode described herein is a mode that a user's finger or an input unit such as an electronic pen is detectable and may include a memo input mode, a message input mode, an email input mode, or a document preparing mode. In addition, the input mode may include a situation where an application is executed and a touch panel capable of detecting the input unit is operating.

In addition, the electronic device may be a portable electronic device such as a portable terminal, a mobile terminal, a media player, a tablet computer, a handheld computer, or a Personal Digital Assistant (PDA). Furthermore, the electronic device may be an arbitrary portable electronic device including a device to which two or more functions among the above-described devices are combined. According to another embodiment, the electronic device may include any kind of electronic device including a display and an input unit. For example, the electronic device may include a desktop computer, a refrigerator, a multi-function peripheral, a video game console, a digital camera, a mobile Internet devices (MID), an ultra mobile PC (UMPC), a navigation device, a smart TV, a digital watch, and an MP3 player.

Embodiments below are described regarding an electronic device including a touch screen. However, it will be easily understood to those skilled in the art that although the touch screen is not included, embodiments described herein may also be appropriately applied to an electronic device or a computing device including an input unit different from a display. For example, the electronic device may include a hard key for entering the input mode and control a transmission output value according to an input from the hard key.

FIG. 1 is a block diagram illustrating a configuration of an electronic device controlling a transmission output according to various embodiments of the present disclosure.

As illustrated in FIG. 1, an electronic device 100 includes a memory 110, a processor unit 120, an audio processing unit 130, a communication system 140, an input/output control unit 150, a touch screen 160, and an input device 170. Here, any one or more of the above-mentioned configuration may be included in plurality. For example, the electronic device may include a plurality of memories 110 and a plurality of communication systems 140.

A description about each component is as follows.

The memory 110 may include a program storing unit 111 for storing programs for controlling an operation of the electronic device 100 and a data storage unit 112 for storing data generated during execution of the programs. For example, the data storage unit 112 may store various updatable filing data such as a phone book, outgoing and incoming messages, and store reference information used for determining a time for a transmission output control. Here, the transmission output control time may be a time for entering the input mode and the reference information may include reference information (critical value) for determining whether there is a touch input and/or a hovering input, or reference information for determining a withdrawn state of the input unit.

In addition, the data storage unit 112 may store a transmission output value controlled according to whether to enter the input mode. For example, the data storage unit 112 may store a transmission output value necessary to be reduced when the input mode is entered and a transmission output value necessary to be recovered when the input mode is released.

The program storage unit 111 may include an operating system program 113, an output control program 114, an input recognition program 115, and at least one application program 116. Here, the programs stored in the program storing unit 111 may be represented with instruction sets. In addition, the programs stored in the program storage unit 111 may be represented with hardware configurations. For example, the electronic device may include an operating system module, an output control module, and a touch recognition module.

The operating system program 113 may include various software elements for controlling general system operations. Such a general system operation control may mean, for example, memory management and control, storage hardware (device) control and management, and power control and management, etc. Such an operating system 113 may perform a function of enabling free communication between hardware (devices) and program elements (modules).

The output control program 114 may include various software configurations for controlling transmission output values according to whether to enter the input mode.

For example, when an input to a touch panel is not detected, the output control program 114 may allow transmission power to have a preset default value.

In addition, when an input to the touch panel is detected, the output control program 114 may back off transmission power from the default value to a preset transmission power value.

According to an embodiment, the output control program 114 may roughly allow an output to have a default output value corresponding to about 23 to 29.5 dBm and then output to have a value corresponding to power backed off to about 18 to 22.5 dBm. That is, the output control program 114 may reduce an electromagnetic wave SAR by reducing transmission power by about 5 to 7 dBm. Since a state of entering the input mode is based on an assumption that a human body is in proximity, the output control program 114 may perform a power back-off operation in this case.

In addition, when entering the input mode and then confirming that the input mode is released, the output control program 114 may return the power backed-off output value to the default value.

The input recognition program 115 may include at least one software element for detecting a user input for requesting entering the input mode.

The input recognition program 115 may detect the request for entering the input mode by detecting an input to the touch panel.

In addition, the input recognition program 115 may detect the request for entering the input mode by detecting that an input unit (for example, an electronic pen, a stylus pen, etc.) inserted into the electronic device is withdrawn. For example, the input recognition program 115 may detect an inserted or withdrawn state of the input unit (for example, a magnetic property of the input unit) by using a sensor (for example, a Hall sensor).

In addition, the input recognition program 115 may detect the request for entering the input mode by detecting an input to a hard key prepared in the electronic device.

The application program 116 may include software elements for at least one application program installed in the electronic device 100.

In addition, although not shown in the drawing, the program storage unit 111 may include a display program.

The display program may include various software elements for providing and displaying graphics on the touch screen 160. The term graphics may be used herein to include a text, a web page, an icon, a digital image, a video, and animation, etc.

In addition, the display program may include various software elements related to a user interface.

That is, the display program may output a state of the electronic device operating in a state where an output value is reduced. For example, the display program may output an input mode execution screen, a web browser execution screen, and a multimedia playback screen, etc., in the state where an output value is reduced.

In addition, the display program may output information on the reduced output value according to entering the input mode, or output information on the recovered default output value, according to release of the input mode.

The processor unit 120 may include at least one processor 122 and an interface 124. Here, the processor 122 and the interface 124 may be integrated as at least one integrated circuit or implemented in separate elements.

The interface 124 may perform a role of a memory interface controlling an access to the processor 122 and the memory 110.

In addition, the interface 124 may perform a role of a peripheral interface controlling a connection between input/output peripheral devices of the electronic device 100 and the processor 122.

The processor 122 may control to provide various multimedia and communication services by using at least one software program, display on the display unit 162 to allow a graphic user interface (GUI) operation to be confirmed through the input/output control module 150, and control to provide commands input from outside the electronic device 100 through the input device 170. At this point, the processor 122 may execute at least one program stored in the memory 110 and provide a service corresponding to the program.

According to an embodiment, the processor 122 may determine whether to enter the input mode by using information detected by one or more of a plurality of sensors such as a touch sensor, Hall sensor, and touch panel; back off transmission power to a preset transmission power in the input mode; or maintain the transmission power to a default output value without reducing the transmission power in a state where the input mode is not entered.

That is, the transmission output value of the electronic device 100 may be adjusted by software such as the program stored in the memory 110 or by hardware such as the processor.

The audio processing unit 130 may provide an audio interface between the user and the electronic device 100 through a speaker 131 and a microphone 132.

The communication system 140 may perform a communication function for voice communication and data communication of the electronic device 100. At this point, the communication system 140 may be divided into a plurality of communication sub modules supporting different communication networks. For example, the communication network may include, but is not limited to, a Global System for Mobile Communication (GSM) network, an Enhanced Data GSM Environment (EDGE) network, a Code Division Multiple Access (CDMA) network, a W-Code Division Multiple Access (W-CDMA) network, a Long Term Evolution (LTE) network, an Orthogonal Frequency Division Multiple Access (OFDMA) network, a wireless LAN, a Bluetooth network, or a Near Field Communication (NFC) network.

The input/output control module 150 may provide an interface between an input/output device such as the touch screen 160 or the input device 170 and an interface.

The touch screen 160 is an input/output device for performing information display or information input and may include a touch input unit 161 and a display unit 162.

The touch input unit 161 may provide touch information detected by a touch panel to the processor unit 120 through the input/output control module 150. The touch input unit 161 may change touch information into an instruction structure such as a touch_down, touch_move, or touch_up, and provide the instruction structure to the processor unit 120, and generate an input value for controlling the transmission output value according to various embodiments.

The display unit 162 may display state information on the electronic device 10, characters that the user inputs, moving pictures or still pictures, etc. For example, the display unit 162 may display a state of the electronic device operating in a state where an output value is reduced. For example, the display unit 162 may display an input mode execution screen, a web browser execution screen, and a multimedia playback screen, etc., in the state where the output value is reduced In addition, the display unit 162 may output information on the reduced output value according to entering the input mode, or output information on the recovered default output value, according to release of the input mode.

Although not shown in the drawing, the touch screen 160 may include a capacitive touch panel, a touch panel controller, a display panel, a digitizer pad, or a digitizer pad controller, etc.

The input device 170 may provide input data generated by user's selection to the processor unit 120 through the input/output control unit 150. For example, the input device 170 may be configured with a control button for controlling the electronic device 100. For another example, the input device 170 may be configured with a key pad for receiving input data from the user and generate an input value for controlling a transmission output value according to various embodiments.

Although not shown in the drawing, the electronic device 100 may include elements for providing additional functions such as a broadcast receiving module for receiving broadcast, a digital sound source playing module such as an MP3 module, a proximity sensor module for proximity sensing, and an image sensor module, and may further include software for their operations.

According to embodiments, the electronic device includes a display and processor capable of detecting an input and the processor may control the transmission output according to whether to detect an input to the display.

The processor may detect at least any one of a touch input and a hovering input to the display.

The electronic device may include a button for entering the input mode and the processor may control the transmission output according to whether there is an input to the button.

When the input is not detected, the processor may maintain the transmission output as a default output value. According to embodiments, the electronic device maintains the transmission output corresponding to the default output value in a state where the electronic device is not controlled by the input unit.

When the input is detected, the processor may reduce the transmission output to a preset value and output a signal with the reduced transmission output. According to embodiments, the electronic device reduces the transmission output in a state where the electronic device is controlled by the input unit.

The electronic device may include a sensor capable of detecting an input unit state, and the processor may control the transmission output on the basis of a state change of the input unit.

The state change of the input unit includes an inserted state of an electronic pen. When the electronic pen is withdrawn, the processor may reduce the transmission power to the preset value.

When the electronic pen is inserted, the processor may maintain the transmission output as the default value.

Figure 2:
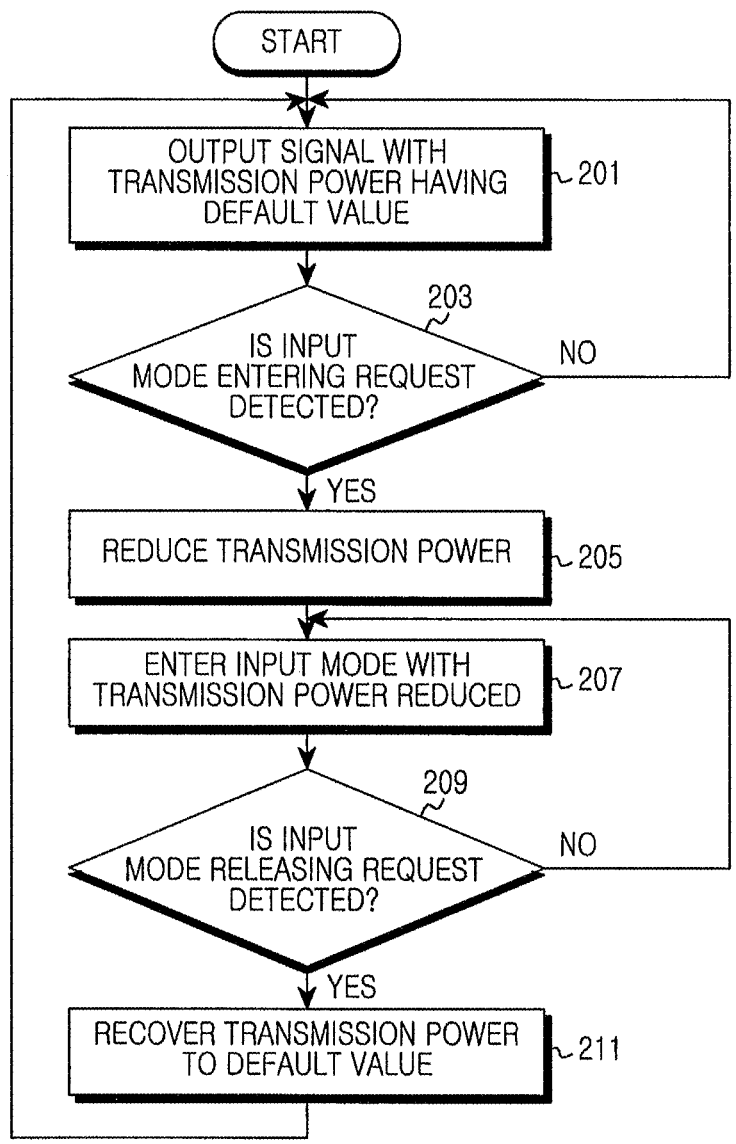
FIG. 2 is a flowchart illustrating a process of controlling transmission output in an electronic device according to various embodiments of the present disclosure.

FIG. 2 is a flowchart illustrating a process of controlling a transmission output in an electronic device according to various embodiments of the present disclosure.

The electronic device may adjust a transmission output value at the time of entering the input mode. For example, the electronic device may adjust the transmission output value when detecting a touch input and/or a hovering input. That is, the electronic device may determine whether to use the electronic device by using an input to the touch panel.

The electronic device may include an input unit enabling the touch input and/or hovering input. Such an input unit may be an electronic pen or a stylus pen having a structure of being inserted into or withdrawn from the electronic device.

In addition, the electronic device may determine an inserted state of the input unit, and adjust the transmission output value when a withdrawn state of the input unit is confirmed.

An electronic device performing such an operation may perform the following processes.

The electronic device may transmit a signal with transmission power having a preset default value in operation 201.

The electronic device may transmit a signal with transmission power having the present default output value in a state where a user input is not detected.

The electronic device may detect an input mode entering request in operation 203.

Here, the input mode entering request is a request for entering a mode where an input unit such as a user's finger or an electronic pen is detectable, and the electronic device may confirm whether, for example, a touch input or a hovering input to the touch panel is detected.

For another example, the electronic device may confirm whether the input unit for generating an input to the touch panel is withdrawn from the electronic device.

For another example, the electronic device may confirm whether a key input for entering the input mode is detected.

When the input mode entering request is not detected, the electronic device may transmit a signal with transmission power having the default output value.

When the input mode entering request is detected, the electronic device may back off the transmission power from the default value to the preset transmission power value.

According to an embodiment, the electronic device may allow the transmission power to have a default output value corresponding to about 23 to 29.5 dBm and a value reduced to about 18 to 22.5 dBm by power being backed off. That is, the electronic device output control program 114 may reduce an electromagnetic wave SAR by reducing transmission power by about 5 to 7 dBm.

The electronic device may enter the input mode in a state where the transmission power is reduced in operation 207.

The input mode may be not only a memo writing mode, a message writing mode, or an email writing mode, but also a mode where an application for operating the touch panel is executed.

The electronic device may detect an input mode releasing request in operation 209.

When the input mode releasing request is not detected, the electronic device may maintain a state where the transmission power is reduced.

When the input mode releasing request is detected, the electronic device may recover the reduced value of transmission power to a predefined default output value.

The electronic device may adjust the transmission power according to entering the input mode in a situation where power is supplied. For example, when detecting the input mode releasing request, the electronic device recovers the reduced value of the transmission power to the predefined default value, outputs the default value, and then confirms whether an input mode entering request is detected and whether to enter the input mode.

By reducing the transmission power for an electronic device controlled by the user according to various embodiments, the electronic device may determine whether to enter the input mode in a power-on state and control the transmission power according to the determination result.

Figure 3:
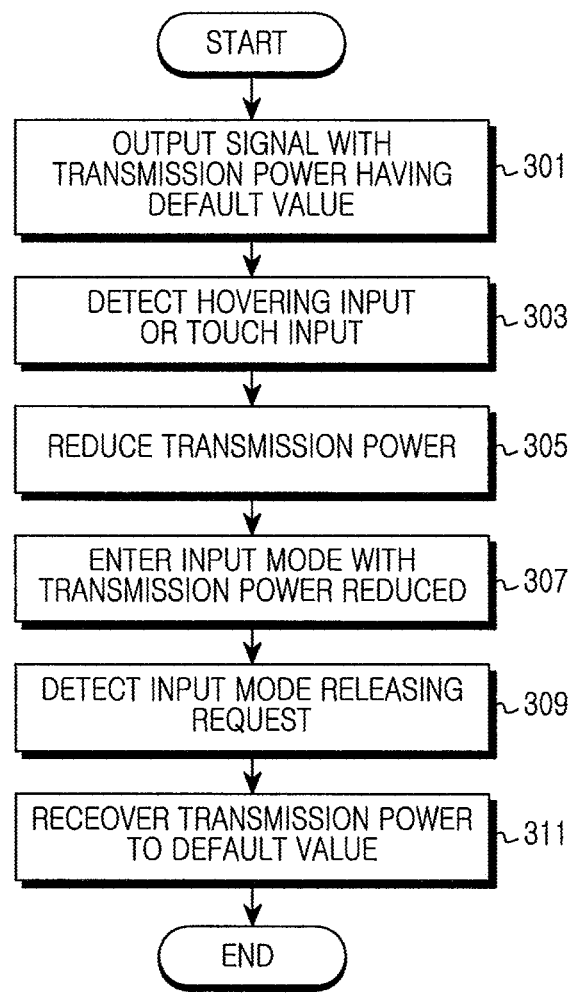
FIG. 3 is a flowchart illustrating a process of detecting an input and controlling transmission output in an electronic device according to embodiments of the present disclosure.

FIG. 3 is a flowchart illustrating a process of detecting an input and controlling transmission power in an electronic device.

Referring to FIG. 3, the electronic device may reduce an electromagnetic wave SAR by adjusting a transmission power value.

The electronic device may adjust the transmission value when entering the input mode. For example, the electronic device may adjust the transmission value when detecting a touch input and/or a hovering input. That is, the electronic device may determine whether to use the electronic device by using an input to the touch panel.

The electronic device performing the above-described operations may perform the following processes.

The electronic device may transmit a signal with transmission power having a preset default output value in operation 301.

In addition, the electronic device may transmit a signal with the transmission power having the preset default output value in a state where a user input is not detected.

The electronic device may detect a hovering input or a touch input in operation 303.

Here, the electronic device may detect the user input to the touch panel. The electronic device may also detect the user input by sensing a sensing region formed by an operation of a sound wave sensor or a spatial sensor.

In addition, when detecting a hovering input or a touch input in operation 305, the electronic device may reduce the transmission power. That is, the electronic device may reduce the transmission power from the default value to a predefined value. Furthermore, when detecting the hovering input or the touch input, the electronic device may reduce the electromagnetic SAR by reducing the transmission power.

The electronic device may enter the input mode in a state where the transmission is reduced in operation 307.

That is, the electronic device may detect a user input in a state where the transmission power is reduced.

For example, the electronic device may perform a memo writing mode, a message writing mode, or an email writing mode in a state where the transmission power is reduced.

For another example, the electronic device may perform a mode for transmitting and receiving data in not only a communication mode such as infrared communication, NFC, wireless LAN, or Zigbee, but also a typical communication network such as CDMA, or LTE in a state where the transmission power is reduced.

For another example, the electronic device may output a web page using a browser in a state where the transmission power is reduced.

In addition, the electronic device may detect an input mode releasing request in operation 309.

The input mode releasing request may be a request for terminating a function performed in a state where the transmission power is reduced.

When the input mode is released in operation 311, the electronic device may recover the reduced transmission power to the default value.

Figure 4:
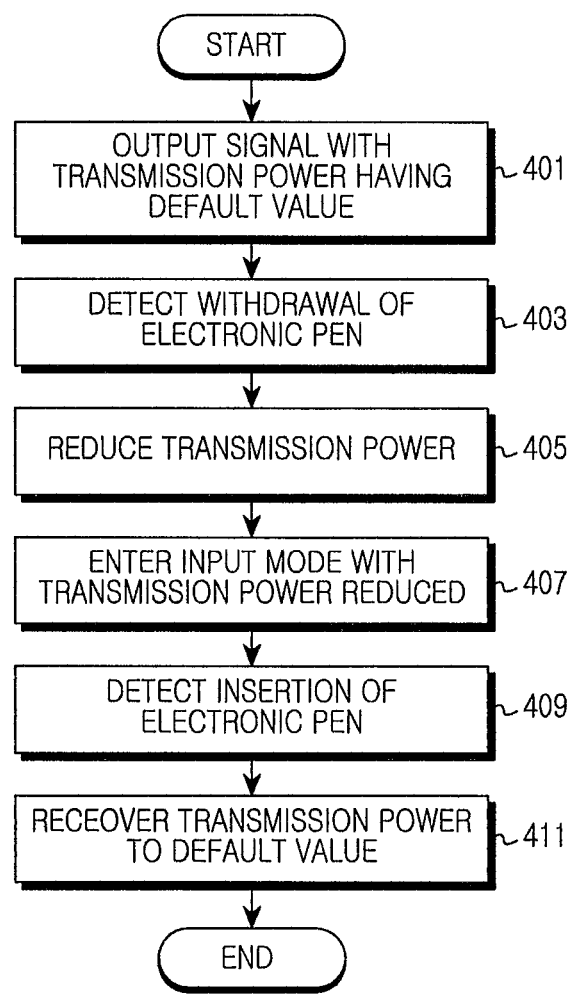
FIG. 4 illustrates a process of detecting a withdrawn state of an input unit and controlling transmission output in an electronic device according to various embodiments of the present disclosure.

FIG. 4 is a flowchart illustrating a process for detecting a withdrawn state of the input unit and controlling the transmission power in the electronic device according to various embodiments of the present disclosure.

Referring to FIG. 4, the electronic device may reduce an electromagnetic wave SAR by reducing a transmission output value.

The electronic device may adjust the transmission output value when entering the input mode. For example, the electronic device may include an input unit such as an electronic pen or a stylus pen for enabling a touch input and/or hovering input, and determine an inserted state of the input unit and adjust the transmission output value.

According to an embodiment, the electronic device may adjust the transmission output value when withdrawal of the input unit is confirmed.

The electronic device performing the above-described operations may perform the following processes.

The electronic device may transmit a signal with transmission power having the preset default output value in operation 401.

In addition, the electronic device may transmit a signal with the transmission power having the preset default value in a state where the user input is not detected.

The electronic device may detect the withdrawal of the electronic pen in operation 403.

For example, the electronic pen includes a magnetic material, and the electronic device may include a sensor (e.g., a Hall sensor) capable of detecting magnetic property.

Such an electronic device may collect sensing information having different values according to an inserted state of the electronic pen and may confirm whether the electronic pen is withdrawn by using such information.

The electronic device may also use various kinds of sensors through which an inserted state of the electronic pen is confirmed.

In addition, the withdrawal of the electronic pen may include at least any one from a state where the electronic pen starts to be withdrawn from the electronic device to a state where the electronic pen is completely withdrawn.

When detecting the withdrawal of the electronic pen in operation 405, the electronic device may reduce the transmission power. That is, the electronic device may reduce the transmission power having the default value to a predefined value. In addition, when detecting the withdrawal of the electronic pen, the electronic device may reduce the electromagnetic wave SAR by reducing the transmission power.

In addition, the electronic device may enter the input mode in a state where the transmission power is reduced in operation 407.

That is, the electronic device may detect a user input in the state where the transmission power is reduced. Here, the user input may include a text, an input representing a figure, a pre-determined input for controlling an operation of the electronic device, or an input for controlling an operation of an application.

Furthermore, the electronic device may detect an inserted state of the electronic pen in operation 409. Here, the inserted state of the electronic pen may include a state where the electronic pen is completely inserted into the electronic device or a state where insertion is detected in a withdrawn state.

When the electronic pen is inserted in operation 411, the electronic device may recover the reduced transmission power to the default value.

Figure 5C:
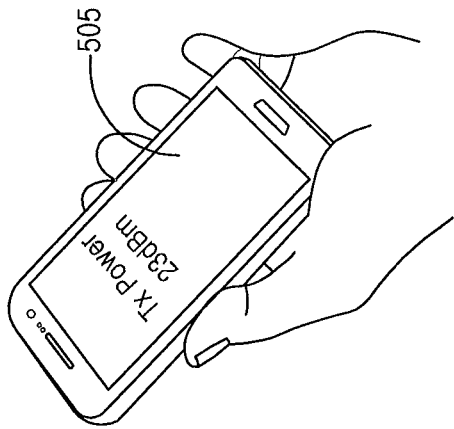
FIGS. 5A, 5B and 5C illustrate a process of controlling transmission power in an electronic device according to various embodiments of the present disclosure.
Figure 5B:
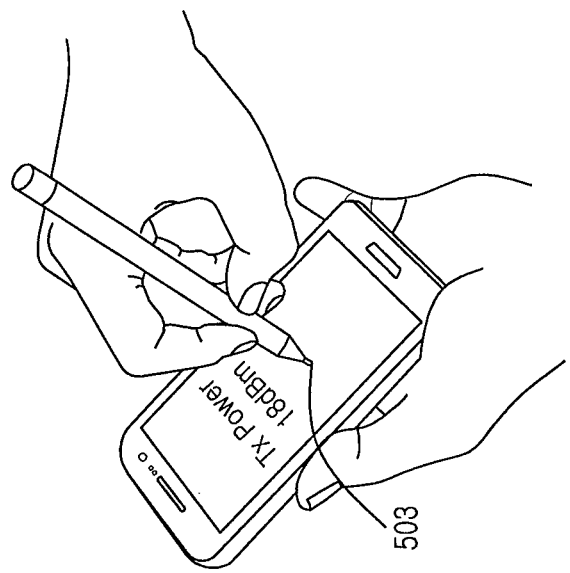
Figure 5A:
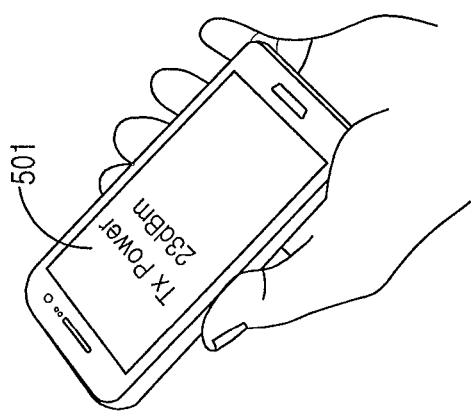

FIGS. 5A to 5C illustrate a process of controlling transmission power in an electronic device according to various embodiments of the present disclosure.

The electronic device may reduce the electromagnetic wave SAR by adjusting a transmission output value.

The electronic device may reduce the transmission output value when entering the input mode. For example, the electronic device may reduce the transmission output value when a touch input and/or a hovering input is detected. That is, the electronic device may determine whether to use the electronic device by using an input to the touch panel.

In addition, the electronic device may use the transmission output value of the default value in a situation where the input mode is released.

That is, the electronic device may transmit a signal with transmission power having the predefined default value in a state (for example, an idle state) before entering the input mode.

For example, the electronic device may transmit (operation 501) a signal with transmission power having the default output value of 23 dBm before entering the input mode as shown in FIG. 5A.

The electronic device may detect an input unit such as a user's finger or an electronic pen and confirm whether to enter the input mode.

The electronic device may detect an input for executing an application, an input for drawing a figure, or an input for writing a text and confirm entering the input mode.

For example, when entering the input mode as shown in FIG. 5B, the electronic device may reduce (operation 502) current transmission power. In the drawing, although the default output value of 23 dBm is reduced to an output value of 18 dBm, the electronic device may flexibly adjust the transmission power within a range where transmission performance is not lowered.

Furthermore, when the input mode is released, the electronic device may recover (operation 505) the reduced transmission power to the default output value as shown in FIG. 5C. The electronic device may reduce the electromagnetic wave SAR by reducing the transmission power at the time of being controlled by the user.

Figure 6B:
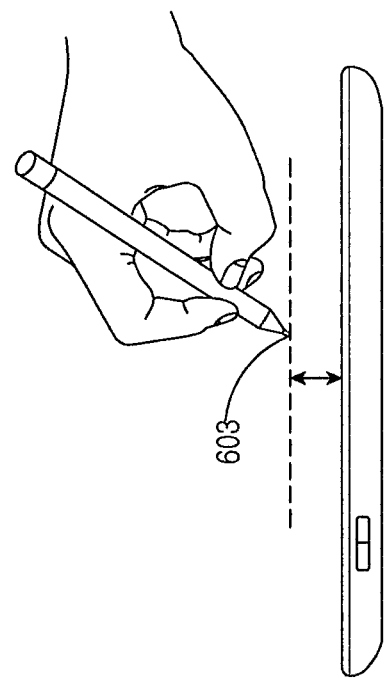
FIGS. 6A and 6B illustrate a situation of entering an input mode in an electronic device according to various embodiments of the present disclosure.
Figure 6A:
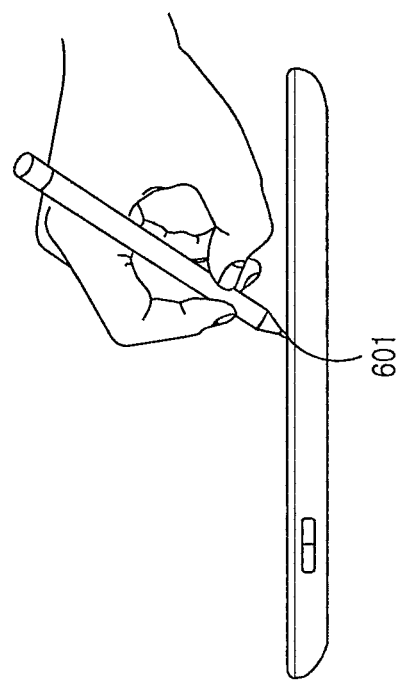

FIGS. 6A and 6B illustrate a situation of entering the input mode in an electronic device according to various embodiments of the present disclosure.

The electronic device may adjust a transmission output value when entering the input mode. For example, the electronic device may adjust the transmission output value when detecting the touch input and/or hovering input.

That is, the electronic device may detect a direct input to the touch panel and confirm entrance to the input mode.

For example, the electronic device may detect (operation 601) an input unit such as a user's finger or an electronic pen directly input to a touch panel surface as shown in FIG. 6A.

For another example, the electronic device may detect (operation 603) the input unit in proximity of a range where the input is detectable, when the input is not directly input to the touch panel surface through the input unit, as shown in FIG. 6B.

Although not shown in the drawing, the electronic device may detect the input unit by detecting a sensing region formed by an operation of a sound wave sensor or a spatial sensor disposed in a portion of the electronic device.

Figures 7A, 7B, 7C:
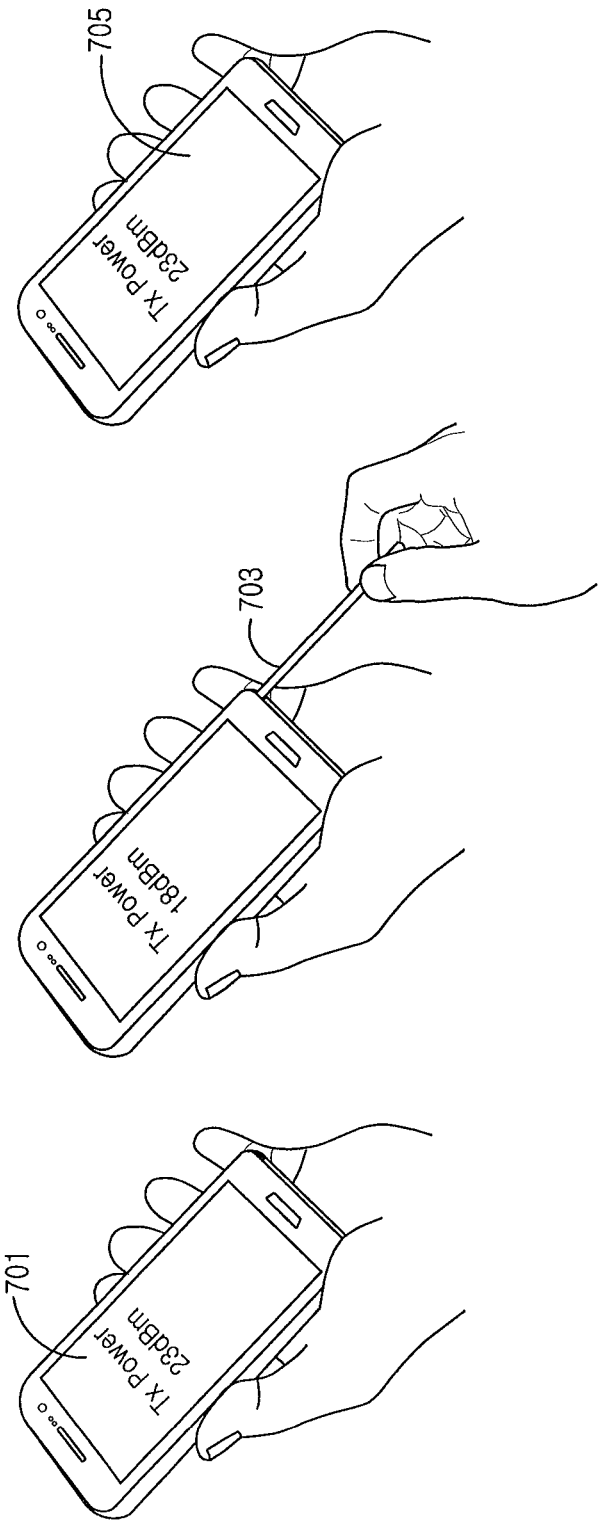
FIGS. 7A, 7B and 7C illustrate a process of controlling a transmission output in an electronic device according to various embodiments of the present disclosure.

FIGS. 7A to 7C illustrate a process of controlling transmission power in an electronic device according to various embodiments of the present disclosure.

The electronic device may reduce the electromagnetic wave SAR by adjusting a transmission output value.

The electronic device may include an input unit enabling the touch input and/or hovering input. Such an input unit may be an electronic pen or a stylus pen having a structure capable of being inserted into or withdrawn from the electronic device.

In addition, the electronic device may determine an inserted state of such an input unit and adjust the transmission output value when withdrawal of the input unit is confirmed.

In addition, the electronic device may use the transmission output value of the default value in a state where the input unit is inserted.

For example, the electronic device may transmit (operation 701) a signal with transmission power having the default output value of 23 dBm in a state where the electronic pen is inserted as shown in FIG. 7A.

The electronic pen, which is an input unit of the electronic device, includes a magnetic material and the electronic device may include a sensor (e.g., a Hall sensor) capable of detecting magnetic property.

Such an electronic device may collect information having difference values according to the inserted state of the electronic device and confirm whether the electronic pen is withdrawn by using the information.

For example, when confirming (operation 703) the withdrawal of the electronic pen as shown in FIG. 7B, the electronic device may reduce current transmission power thereof. In the drawing, the transmission power is reduced from the default output value of 23 dBm to an output value of 18 dBm, but the electronic device may flexibly adjust the transmission power in a range where transmission performance is not lowered.

In addition, when the withdrawn electronic pen is inserted, the electronic device may recover (operation 705) the reduced transmission power thereof to the default output value. The electronic device may reduce the electromagnetic wave SAR by reducing the transmission power at the time of being controlled by the user.

Figure 8:
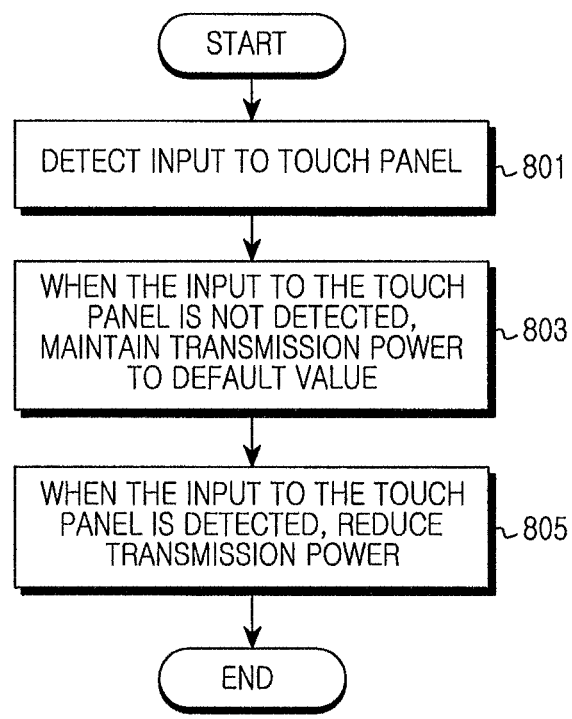
FIG. 8 is a flowchart illustrating a transmission power control process in an electronic device according to various embodiments of the present disclosure.

FIG. 8 is a flowchart illustrating a process of controlling transmission power of the electronic device according to various embodiments of the present disclosure.

Referring to FIG. 8, the electronic device may reduce the electromagnetic wave SAR by reducing the transmission output value.

The electronic device may adjust the transmission output value when detecting an input to the touch panel. For example, the electronic device may adjust the transmission output value when detecting a touch input and/or hovering input.

The electronic device performing such an operation may perform the following processes.

The electronic device may detect an input to the touch panel in operation 801.

At this point, the electronic device may detect the touch input and/or hovering input in a situation where a signal is transmitted with the transmission power having the preset default output value.

In addition, when an input to the touch panel is not detected in operation 803, the electronic device may transmit a signal with transmission power while a value of the transmission power is maintained as the default value.

In addition, when the input to the touch panel is detected in operation 805, the electronic device may transmit a signal with the transmission power reduced from the default value.

For example, when the input to the touch panel is not detected, the default output value of 23 to 29.5 dBm may be used. When the input to the touch panel is detected, a reduced output value of 18 to 22.5 dBm of the transmission power is used and the electromagnetic wave SAR may be reduced.

According to embodiments, a method of controlling transmission power in an electronic device may include an operation of confirming whether an input mode entering request is detected, an operation of maintaining a value of transmission power as a default output value in case of not detecting the input mode entering request, and an operation of reducing the transmission power to a preset value.

The input mode entering request may include at least one of a touch input and a hovering input.

The operation of confirming whether to detect the input mode entering request may include an operation of detecting the input to the touch panel.

The operation of confirming whether to detect the input mode entering request may include an operation of detecting an input in a sensing region formed by an operation of at least one of a sound wave sensor and a spatial sensor.

The input mode entering request may include a button input for entering the input mode.

The input mode entering request may include withdrawal of an electronic pen inserted into the electronic device.

The operation of confirming whether to detect the input mode entering request may include an operation of detecting magnetic property of the electronic pen.

Each of the above-described elements of the electronic device according to the embodiments may be configured with one or more components and a name of a corresponding element may differ according to a type of the electronic device. The electronic device according to the embodiments may be configured with at least one of the above-described elements, some of the elements may be omitted, or additional other elements may be further included. In addition, some of elements of the electronic device according to the embodiments may be combined to be one entity and the entity may perform the same functions of the corresponding elements before the combination.

A term element used herein, for example, "module" may mean, for example, a unit including one of or a combination of two or more of hardware, software, and firmware. The "module" may be interchangeably used with a unit, a logic, a logical block, a component, or a circuit. The "module" may be a minimum unit or a portion of an integrated component. The "module" may be a minimum unit or a portion thereof performing one or more functions. The "module" may be implemented mechanically or electronically. For example, the "module" according to the embodiments may include at least one of an application-specific integrated circuit (ASIC) chip, field-programmable gate arrays (FPGAs), and a programmable-logic device performing certain operations already known or to be developed.

According to various embodiments, some devices (for example, modules or functions thereof) or methods (for example, operations) may be implemented with instructions stored in a computer-readable storage medium in a programming module type. When the instructions are executed by one or more processors, the one or more processors may perform functions corresponding to the instructions. The computer-readable storage medium may be, for example, a memory. At least some of the instructions may be implemented (for example, executed) by the processors. At least some of the programming modules may include, for example, modules, programs, routines, instruction sets, or processes for performing one or more functions.

The computer readable recording medium includes Magnetic Media such as hard disk, floppy disk, or magnetic tape, Optical Media such as Compact Disc Read Only Memory (CD-ROM) or Digital Versatile Disc (DVD), Magneto-Optical Media such as floptical disk, and a hardware device such as ROM. RAM, flash memory storing and executing program commands. Further, the program instructions include a machine language code created by a complier and a high-level language code executable by a computer using an interpreter. The foregoing hardware device may be configured to be operated as at least one software module to perform an operation of the present disclosure.

Modules or programming modules according to the present disclosure may include one or more of the foregoing elements, have some of the foregoing elements omitted, or further include additional other elements. Operations performed by the modules, the programming modules or other elements may be executed in a sequential, parallel, repetitive or heuristic manner. Also, some of the operations may be executed in different order or omitted, or may have additional different operations.

According to various embodiments, in a storage medium storing instructions, the instructions, when executed by at least one processor, are set to allow the at least one processor to perform at least one operation. The at least one operation includes confirming that an input mode entering request is detected, when the input mode entering request is not detected, maintaining transmission power to a default value, and reducing the transmission output to a preset value, when the input mode entering request is detected.

According to various embodiments, an electromagnetic SAR can be efficiently reduced by selectively controlling transmission power according to a corresponding function by using whether to enter an input mode without using a sensor determining grasping of a user.

While the disclosure has been shown and described with reference to certain preferred embodiments thereof, it will be understood by those skilled in the art that various changes in form and details may be made therein without departing from the spirit and scope of the disclosure as defined by the appended claims. Therefore, the scope of the disclosure is defined not by the detailed description of the disclosure but by the appended claims, and all differences within the scope will be construed as being included in the present disclosure.

What is claimed is:

1. An electronic device comprising:
   a sensor configured to obtain information associated with a state of an input unit; and
   a processor configured to:
   determine whether the input unit is withdrawn based on the information obtained by the sensor, and
   when the input unit is withdrawn, reduce a transmission power to a preset value.

2. The electronic device of claim 1, wherein the input unit comprises an electronic pen.

3. The electronic device of claim 1, further comprising a button configured to enter an input mode,
   wherein the processor is configured to control the transmission power according to whether there is an input to the button.

4. The electronic device of claim 1, wherein, when the input unit is inserted, the processor maintains the transmission power to a default value.

5. The electronic device of claim 1, wherein, when the input unit is inserted after the transmission power is reduced, the processor recovers the reduced transmission power to a default value.

6. The electronic device of claim 1, wherein, when an input is detected on a display after the transmission power is reduced, the processor recovers the reduced transmission power to a default value.

7. The electronic device of claim 6, wherein, when the input is detected comprises a state where the electronic device is controlled by an input unit.

8. A method of controlling transmission power in an electronic device, comprising:
   obtaining information associated with a state of an input unit;
   determining whether the input unit is withdrawn based on the obtained information; and
   when the input unit is withdrawn, reducing a transmission power to a preset value.

9. The method of claim 8, wherein determining whether the input unit is withdrawn comprises determining whether an electronic pen is withdrawn.

10. The method of claim 9, wherein when the input unit is inserted after the transmission power is reduced, recovering the reduced transmission power to a default value.

11. The method of claim 9, wherein when an input is detected on a display after the transmission power is reduced, recovering the reduced transmission power to a default value.

12. The method of claim 8, wherein an input mode entering request comprises a button input for entering the input mode.

13. The method of claim 11, wherein the input is detected comprises a state where the electronic device is controlled by an input unit.

14. The method of claim 13, wherein obtaining information associated with a state of an input unit comprises detecting a magnetic property of the electronic pen.

15. A non-transitory computer readable medium having a program recorded thereon, which, when executed causes a computer to perform:
   obtaining information associated with a state of an input unit;
   determining whether the input unit is withdrawn based on the obtained information; and
   when the input unit is withdrawn, reducing a transmission power to a preset value.

16. The non-transitory computer readable medium of claim 15, wherein, when the input unit is inserted after the transmission power is reduced to a default value.

17. The non-transitory computer readable medium of claim 16, wherein, when an input is detected on a display after the transmission power is reduced, recovering the reduced transmission power to the default value.

* * * * *